(12) United States Patent
Nicholson et al.

(10) Patent No.: US 6,550,752 B2
(45) Date of Patent: Apr. 22, 2003

(54) HYDRAULICALLY DAMPED MOUNTING DEVICE

(75) Inventors: Ian Nicholson, Melksham (GB); Daniel Adam Crabb, Chippenham (GB)

(73) Assignee: Avon Vibration Management Systems Limited, Chippenham Wiltshire (GB)

( * ) Notice: Subject to any disclaimer, the term of this patent is extended or adjusted under 35 U.S.C. 154(b) by 0 days.

(21) Appl. No.: 09/884,325

(22) Filed: Jun. 19, 2001

(65) Prior Publication Data

US 2002/0030314 A1 Mar. 14, 2002

(30) Foreign Application Priority Data

Jun. 22, 2000 (GB) .............................................. 0015346

(51) Int. Cl.$^7$ ................................................ F16F 13/00
(52) U.S. Cl. .................................. 267/140.13; 267/140.4
(58) Field of Search ....................... 267/140.11, 140.13, 267/141, 152, 153, 140, 140.3, 140.4

(56) References Cited

U.S. PATENT DOCUMENTS

| 3,721,417 A | * | 3/1973 | Skala et al. ............ 267/140.11 |
| 4,786,035 A |   | 11/1988 | Elliott |
| 4,946,144 A |   | 8/1990 | Geno et al. |
| 5,330,163 A | * | 7/1994 | Bodin et al. ............ 267/140.13 |
| 6,446,947 B1 | * | 9/2002 | Sauvat et al. .......... 267/140.13 |

FOREIGN PATENT DOCUMENTS

| EP | 0 115 417 A2 |   | 8/1984 |
| EP | 0622560 A1 | * | 4/1994 |
| FR | 2340834 A | * | 10/1977 |
| FR | 2604231 A | * | 3/1988 |
| GB | 2 282 430 A |   | 9/1994 |

* cited by examiner

Primary Examiner—Christopher P. Schwartz
Assistant Examiner—Melanie Torres
(74) Attorney, Agent, or Firm—Cook, Alex, McFarron, Manzo, Cummings & Mehler, Ltd.

(57) ABSTRACT

A hydraulically damped mounting device has a first anchor part in the form of a clip and a second anchor part in the form of a boss connected to the cup by a deformable wall. The deformable wall bounds a working chamber for hydraulic fluid which is connected to a compensation chamber by a passageway. A strap is provided extending around the mounting device which is fixed to either or both of the anchor parts. The fixing may be via a clip.

17 Claims, 10 Drawing Sheets

HYDRAULICALLY DAMPED MOUNTING DEVICE

BACKGROUND OF THE INVENTION

1. Field of the Invention

The present invention relates to a hydraulically damped mounting device. Such a device usually has a pair of chambers for hydraulic fluid, as a pair of chambers for hydraulic fluid, connected by suitable passageway, and damping is achieved due to the flow of fluid through that passageway.

2. Summary of the Prior Art

EP-A-0115417 and GB-A-2282430 discussed a type of hydraulically damped mounting devices for damping vibration between two parts of a piece of machinery, e.g. a car engine and a chassis, referred to as a "cup and boss" type of mounting device, in which a "boss", forming one anchor part to which one of the pieces of machinery was connected, was itself connected via a deformable (normally resilient) wall to the mouth of a "cup", which was attached to the other piece of machinery and formed another anchor part. The cup and the resilient wall then defined a working chamber for hydraulic fluid, which was connected to a compensation chamber by a passageway (usually elongate) which provided the damping orifice. The compensation chamber was separated from the working chamber by a rigid partition, and a flexible diaphragm was in direct contact with the liquid and, together with the partition formed a gas pocket.

In the hydraulically damped mounting devices disclosed in the specifications discussed above, there was a single passageway. It is also known, from other hydraulically damped mounting devices, to provide a plurality of independent passageways linking the chambers for hydraulic fluid.

FIG. 1 of the accompanying drawings shows one example of a "cup and boss" type of mounting device which has been disclosed in our GB-A-2282430. The mounting device is for damping vibration between two parts of a structure (not shown), and has a boss 1 connected via a fixing bolt 2 to one of the parts of the structure, and the other part of the structure is connected to a generally U-shaped cup 4. A resilient spring 5 of e.g. rubber interconnects the boss 1 and the cup 4 and extends across the mouth of the cup 4. Thus, a working chamber B is defined within the mount, bounded by the resilient spring 5 and the partition 7.

The interior of the partition 7 defines a convoluted passageway 9 which is connected to the working chamber 8 via an opening 10 and is also connected via an opening 11 to a compensation chamber 12. Thus, when the boss 1 vibrates relative to the cup 4 (in the vertical direction in FIG. 1), the volume of the working chamber 8 will change, and hydraulic fluid in that working chamber 8 will be forced through the passageway 9 into, or out of, the compensation chamber 12. This fluid movement causes damping. The volume of the compensation chamber 12 needs to change in response to such fluid movement, and therefore the compensation chamber 12 is bounded by a flexible wall 13.

In use, the force received by the mounting device is principally parallel to the fixing bolt 2, and this direction defines an axis of the boss 1.

The above structure is generally similar to that described in EP-A-0115417, and the manner of operation is similar. In EP-A-0115417, the partition supported a diaphragm which acted as a boundary between fluid in the working chamber and a gas pocket. In the arrangement shown as FIG. 1, there is an annular diaphragm 50 which is convoluted. That diaphragm 50 is held on the partition 7 by an upper snubber plate 22, that snubber plate 22 is held in pace by a ring 40, which is clamped to the partition 7 and to the cup 4, by a clamping ring 41. The resilient spring 5 is also connected to the ring 40. The upper snubber plate 22 has openings 21 which permits fluid in the working chamber 8 to contact the diaphragm 50.

In the arrangement shown in FIG. 1, the passageway 9 is in the form of a spiral, and the internal dimensions of that spiral are uniform.

Under normal operation, the resilient wall is sufficiently strong to resist the forces that will be applied to it due to movement of e.g. the engine relative to the chassis. However, if the vehicle is involved in a crash or in some extreme driving conditions, very large forces can be applied to the mount due to movement of the engine relative to the chassis, and it is desirable to provide additional restraint on the movement of the boss relative to the cup to prevent excessive movement of the engine. It is therefore known to provide a strap, usually of braided steel or wire, which extends around the mounting device so as to pass over the boss and under the cup to provide a restraint on the total movement of the mounting device.

In the known arrangement, the strap is not fixed to the rest of the mounting device, but lies in grooves where it is held by the force from the resilient wall interconnecting the cup and boss forcing the cup and boss outwardly away from each other, with that force being resisted by the strap.

SUMMARY OF THE INVENTION

In such arrangements, there is a risk that the strap may become loose from the mounting device, particularly during the assembly process of the vehicle on which the mounting device is used and therefore at its most general the present invention proposes that the strap is fixed to the cup and/or the boss.

Thus, the present invention may provide a hydraulically damped mounting device comprising:

first and second anchor parts connected by a first deformable wall;

a working chamber at least partially bounded by the first deformable wall;

a compensation chamber for the hydraulic fluid, the compensation chamber being bounded by a second deformable wall;

a passageway for the hydraulic fluid interconnecting the working and compensation chambers; and a strap extending between the first and second anchor parts and fixed to at least one of said first and second anchor parts.

In such an arrangement, the first anchor part may be formed by the cup, and the second anchor part by the boss. Preferably, the strap is fixed to the corresponding anchor part by a clip fixedly secured to the strap.

In some embodiments of the present invention, the strap is fixed to the boss. Then, and appropriate clip may have a projecting part which is received in a bore in the upper surface of the boss to provide suitable engagement.

Normally, the strap forms a closed loop which extends from the clip secured to the boss around the base of the cup and back to the clip. Another possibility, however, is to provide a strap with free ends, with clips fixedly secured to the respective ends, and the clips then being secured to the boss. Such a strap may loop around the base of the cup in the same way as for a closed looped strap, but the use of two clips may make the respective ends of the straps to be fixed to different parts of the boss.

Furthermore, it is then desirable that the base of the cup has at least one deformable tang to define a slot into which the strap may be received and the tang deformed to hold the strap to the base. Preferably, there are multiple tangs, and preferably the slots open axially inwardly.

In other embodiments, the strap is fixed to the cup, again, for example, by a suitable clip. There may also be a location clip fixed to the boss which engages the strap and secures the strap to the boss. However, it is then preferable that the strap slides in such a location clip. This enables the position of the strap to be adjusted to ensure that it is symmetric about the mounting device.

Again, with the strap fixed to the cup, it is possible for the strap to be a closed loop, or for the strap to be formed by strap parts with free ends extending from the clip, with those free ends then being secured to the boss either by fixed or by adjustable clips.

Guides attached to the strap may also be provided to fit to the side of the mounting device intermediate the top of the boss and the base of the cup. The guides are preferably integral with a strap. These guides distribute the load on the mounting device from the strap, and also may assist in correct positioning of the strap.

Alternatively, or in addition, resilient pads may be provided between the strap and the side of the mounting device intermediate the top of the boss and the base of the cup. Such pads may, for example, be moulded onto the flange which attaches to the clamping ring which holds the partition onto the cup. The use of such pad enables the stiffness imparted to the mounting device by the strap to be adjusted to a suitable value. It also prevents damage to the sides of the mounting device.

It is also known to mount a heat shroud on the boss, which extends over the resilient wall to reflect away from the mount heat from surrounding heat sources, such as the vehicle engine. In a development of the present invention, the orientation clip has a projection therefrom extending away from the boss onto which the heat shroud is fitable. This is advantageous since the heat shroud cannot then be fitted until the strap itself has been fitted, to prevent erroneous assembly. The orientation clip may be the clip fixed to the strap which secures the strap to the boss. Alternatively, the orientation clip may slide on the strap, for example if the strap is fixed to the cup by another clip.

The strap should be substantially inelastic. Thus, the stiffness (i.e. the force needed to achieve unit elongation) should be at least $1 \times 10^6$ Nm$^{-1}$, preferably at least $2 \times 10^6$ Nm$^{-1}$. Note that a stiffness greater than $10 \times 10^6$ Nm$^{-1}$ may be difficult to achieve with sufficiently light materials.

BRIEF DESCRIPTION OF THE DRAWINGS

Embodiments of the present invention will now be described in detail, by way of example, with reference to the accompanying drawings in which:

FIGS. 4a and 4b shows sectional views through an orientation clip used in the embodiment of FIG. 1, with the view of FIG. 4b being taken perpendicular to the view of 4a.

DETAILED DESCRIPTION

Figure 1:
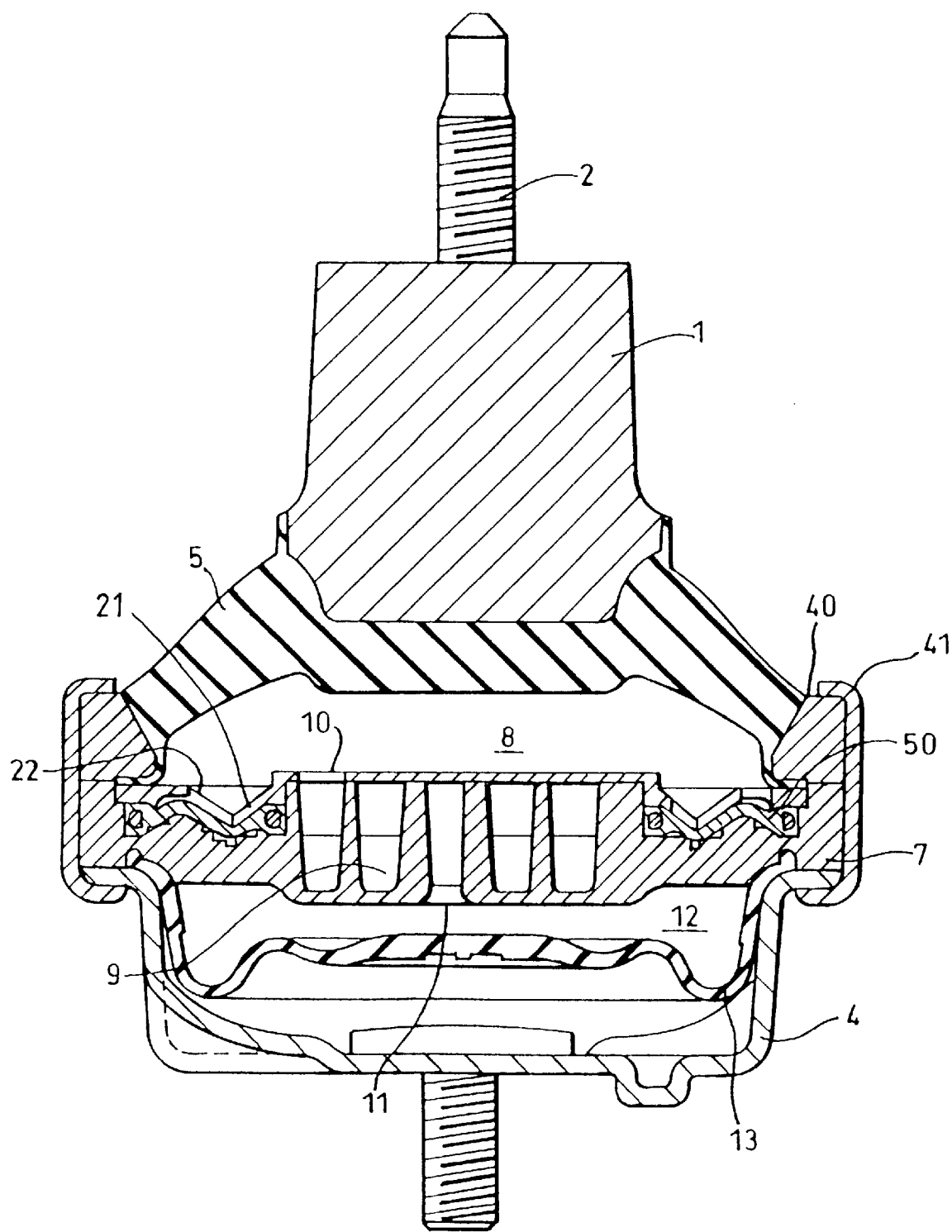
FIG. 1 is a cross-sectional through a known hydraulically damped mounting device and has already been discussed.
Figure 2:
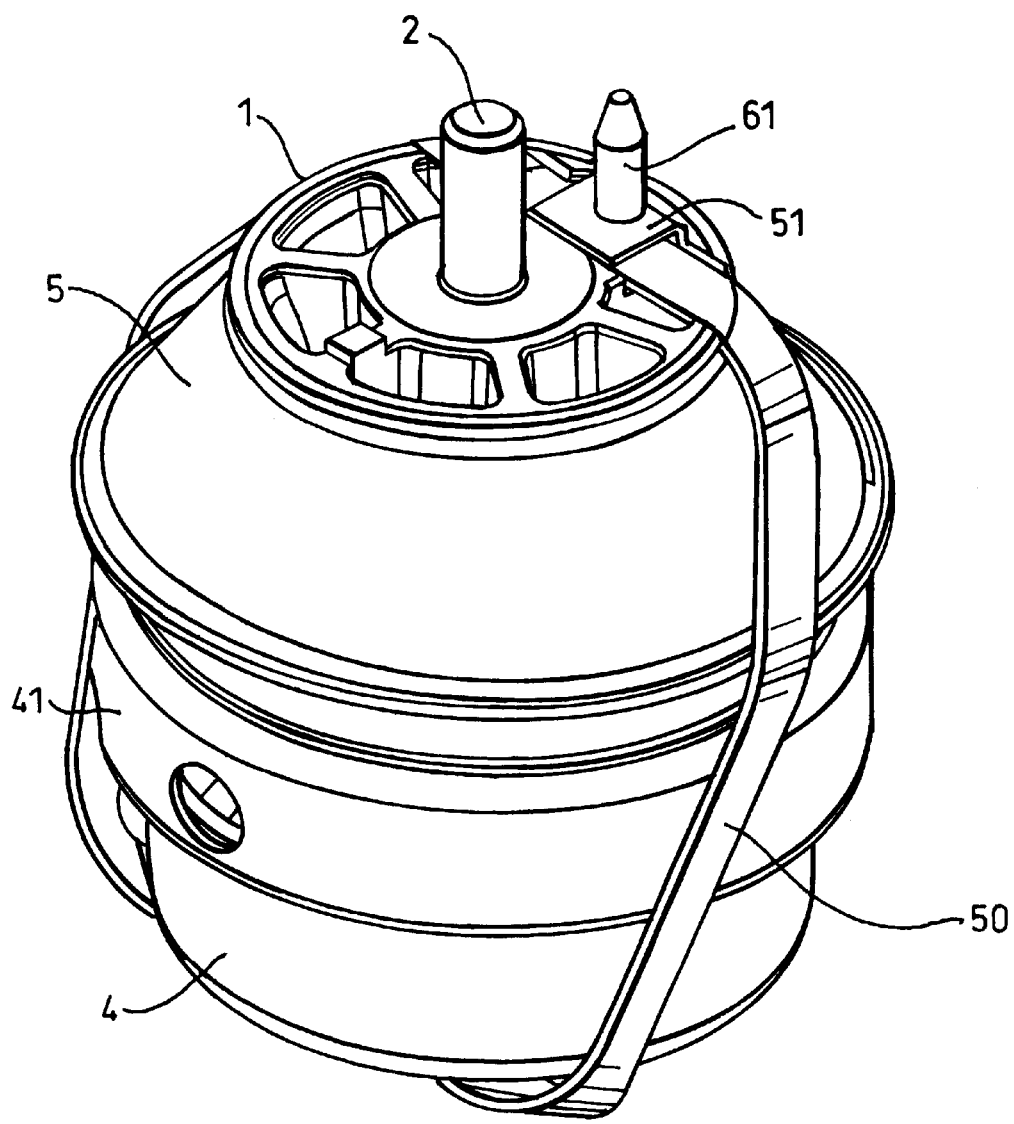
FIG. 2 is a perspective view of the first embodiment of the present invention.

FIG. 2 illustrates a first embodiment of a hydraulically damped mounting device according to the present invention. In many ways, the mounting device similar to that of FIG. 1, and the same reference numerals are used to indicate corresponding parts. In particular, there is a boss 1 which is connected to a cup 4 via a resilient spring 5 of eg rubber. The internal structure of the mounting device of FIG. 2 may be similar to that of FIG. 1, and conventional variations to that internal structure such as discussed in eg EP-A-0115417 may also be used.

Figure 3:
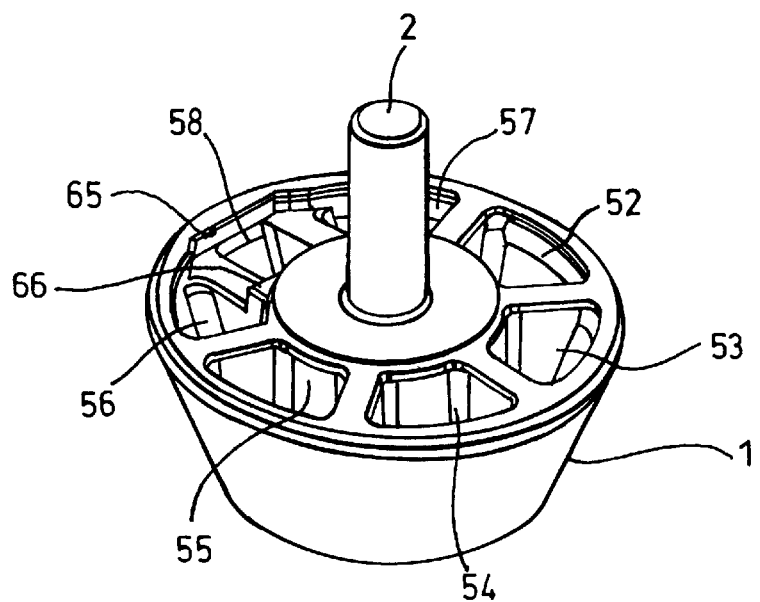
FIG. 3 shows part of the hydraulically damped mounting device of FIG. 1.
Figure 4A:
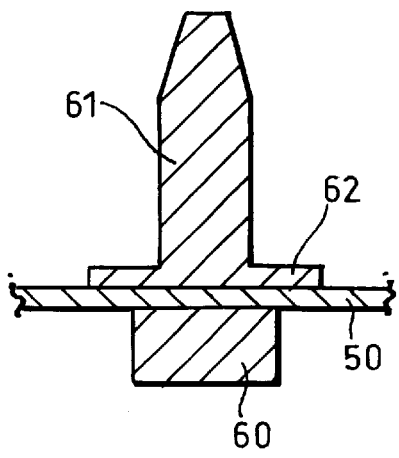
Figure 4B:
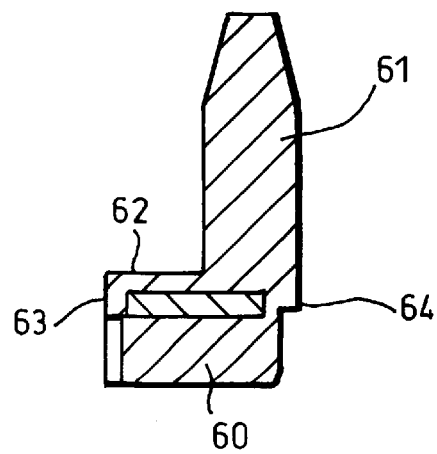

The embodiment of FIG. 2 differs from the mount of FIG. 1 in that it has a strap 50 which extends around the mounting device and has a clip 51 thereon, by which the strap 50 is secured to the boss 1. The strap 50 then extends over the resilient spring 5, and around the cup 4 to pass under the base of the cup 4. FIG. 3 shows the boss 1 in more detail. In particular, the boss has a plurality of blind boxes 52, 53, 54, 55, 56, 57 and 58 therein, one 58 of which is shaped to receive the orientation clip 51. The orientation clip 51 is shown in more detail in FIGS. 4a and 4b and has a base part 60 which fits the bore 58 and a projection part 61 which in use will project upwardly from the boss 1, and be connected to a heat shroud as will be explained in more detail later. The base and projection part 60, 61 are integrally moulded together around the strap 50, as can be seen in more detail in FIG. 4b, which illustrates that the projection part terminates in a plate 62 which overlies the strap 50 and has projections 63, 64 which merge with the base part 60, The result is that the strap is wholly enclosed within the clip 51. The projections 63, 64 are shaped so as to match the walls 65, 66 of the boss 1 adjacent the bore 58. The clip 51 then has a snap-fit into the bore 58, thereby securing the strap 50 to the rest of the mounting device.

Figure 5:
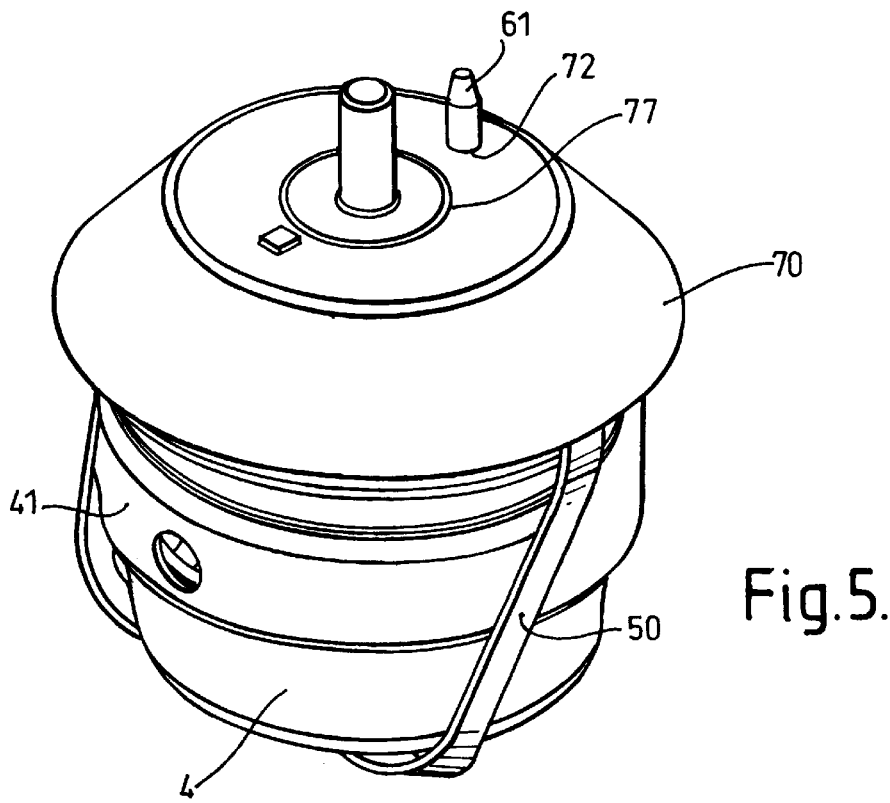
FIG. 5 is a view of the embodiment of FIG. 2 with a heat shroud fitted thereto.

As was mentioned above, a heat shroud may be fitted to the mount. This is illustrated in FIG. 5 which corresponds to FIG. 2, but with the heat shroud 70 in place. The heat shroud 70 covers the resilient spring 5, and so protects it from external heat sources. The shroud 70 has a first opening 71 through which the bolt 2 passes, and a second opening 72 which fits over the projecting part 61 of the orientation clip 51. The clip 51, and in particular the projection part 61, thus forms the structure for securing the heat shroud 70 to the mount. This has the advantage that, in the absence of the strap 50, the heat shroud 70 cannot be fitted.

Figure 6A:
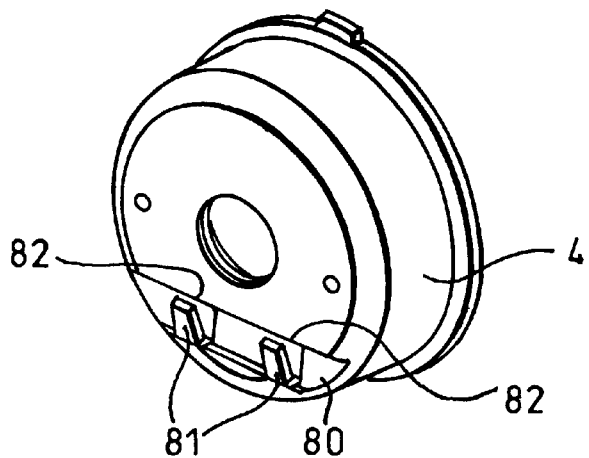
FIGS. 6a and 6b are perspective and sectional views respectively of the cup of the embodiment of FIG. 2.
Figure 6B:
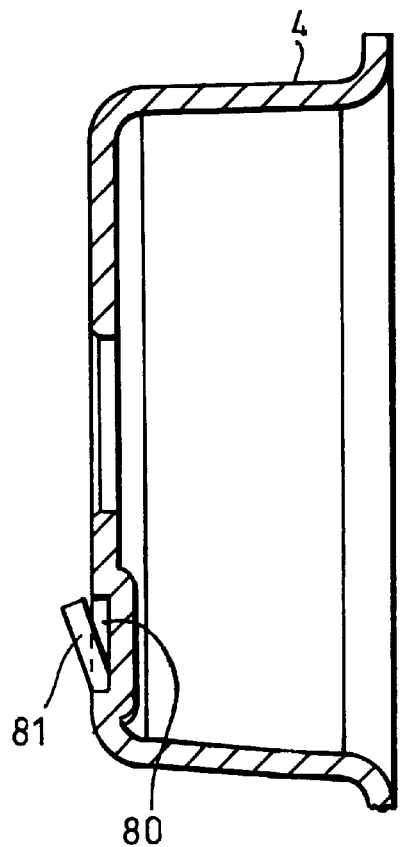

FIGS. 6a and 6b show the cup 4 to illustrate the securing of the strap 50 to the cup 4. In particular, the base of the cup 4 has a transverse groove 80 which receives that part of the strap extending around the base of the cup, and the base of the cup 4 also has two tangs 81 projecting from a side wall of that groove 80. The tangs 81 overlie the strap 50 when the strap 50 is in the groove 80. The tangs may then be deformed towards the base of the cup, forcing the strap into slots 82 in the base of the cup 4 and so providing a secure fixing of the strap 50. It can be seen that the tangs 81 project radially inwardly, as this prevents the strap 50 slipping out of the groove 80 and off the base of the cup 4. It is less likely that the strap will slip radially inwardly, since the shape of the mounting device means that the strap would then extend around a larger circumference than it does in the position in which it fits in the groove 80.

Figure 7:
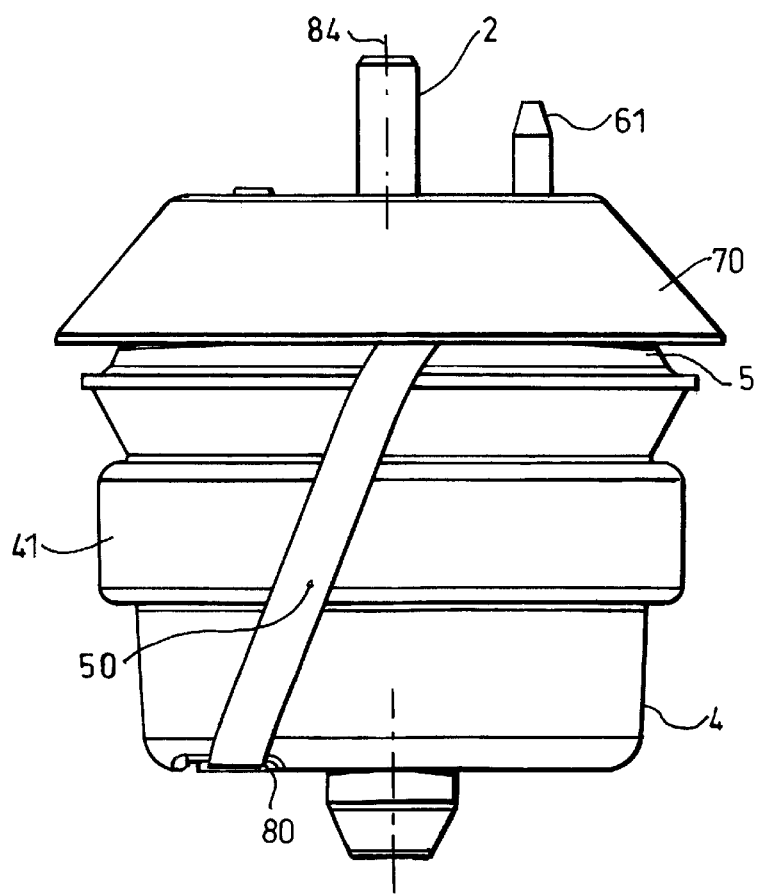
FIG. 7 is a side view of the first embodiment of FIG. 2.

The resulting mounting device is shown in FIG. 7. This view shows how the groove 80 is on the opposite side of the centre plain 84 of the mount to the orientation clip, the position of which is indicated by the projection part 61 which projects from the heat shroud 70.

The strap 50 is preferably of a fabric material, such as woven Nylon or Kevlar. This allows the strap to be light, occupy little space, and be economical, without compromising the strength of the strap. The use of such fabric straps may thus be more beneficial than the known straps of braided steel.

Figure 8:
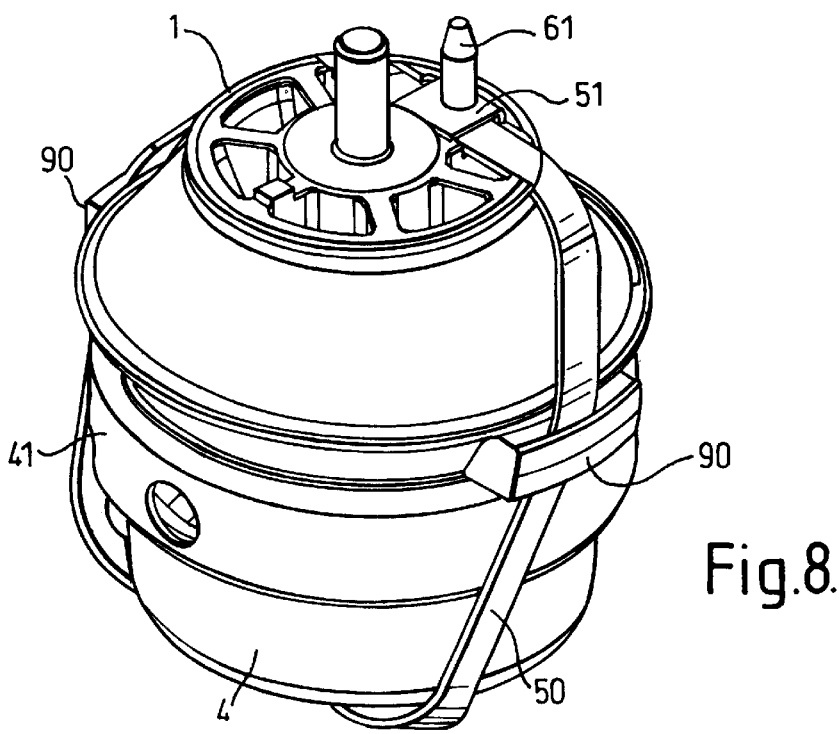
FIG. 8 is a perspective view of a second embodiment of a hydraulically damped mounting device according to the present invention.

FIG. 8 illustrates a second embodiment of the present invention. FIG. 8 is similar to FIG. 2, and the same reference numerals are used to indicate the corresponding parts. Again, the internal structure may be similar to FIG. 1, and conventional variations may also be used.

In FIG. 8, the strap has guides 90 integrally fitted thereto, which fit on the sides of the mounting device which the strap 50 passes. The guides 90 have the effect of distributing the loading due to the strap 50 on the mounting device around the periphery of the cup 4, and thus reduce risk of deformation of the clamping ring 41. Apart from the guides 90, the mounting device of FIG. 8 may be similar to that of the first embodiment of FIG. 2, and have a heat shroud similar to that shown in FIG. 5.

In the first and second embodiments described above, the clip secured to the strap engages the boss. A third embodiment will now be described in which the clip engages the cup. Components of this third embodiment which correspond to components of the first or second embodiments are indicated by the same reference numerals. Again, the internal structure may be similar to FIG. 1, and conventional variations may also be used.

Figure 9:
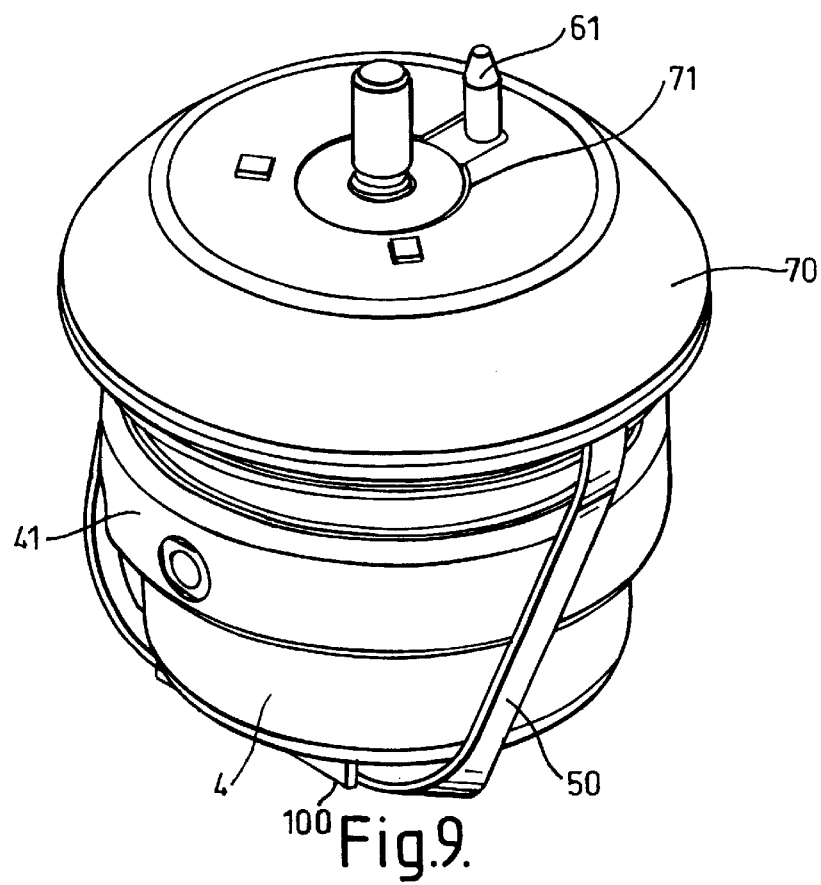
FIG. 9 is a perspective view of a third embodiment of hydraulically damped mounting device according to the present invention.

FIG. 9 shows a general schematic view of the third embodiment, and is similar to FIG. 5. However, in this embodiment, the strap 50 has a clip 100 fixed thereto in a position which underlies the cup 4 when the strap 5 is positioned on the mount. The strap 50 extends around the mount in a similar way to strap 50 of FIG. 5, and again engages an orientation clip, the projecting part 61 of which can be seen in FIG. 9. However, the orientation clip of this embodiment is not fixed to the strap, as will be explained in more detail later. Instead, the strap 50 can slid in the orientation clip, to ensure that the strap is symmetrically positioned on the mount.

Figure 10:
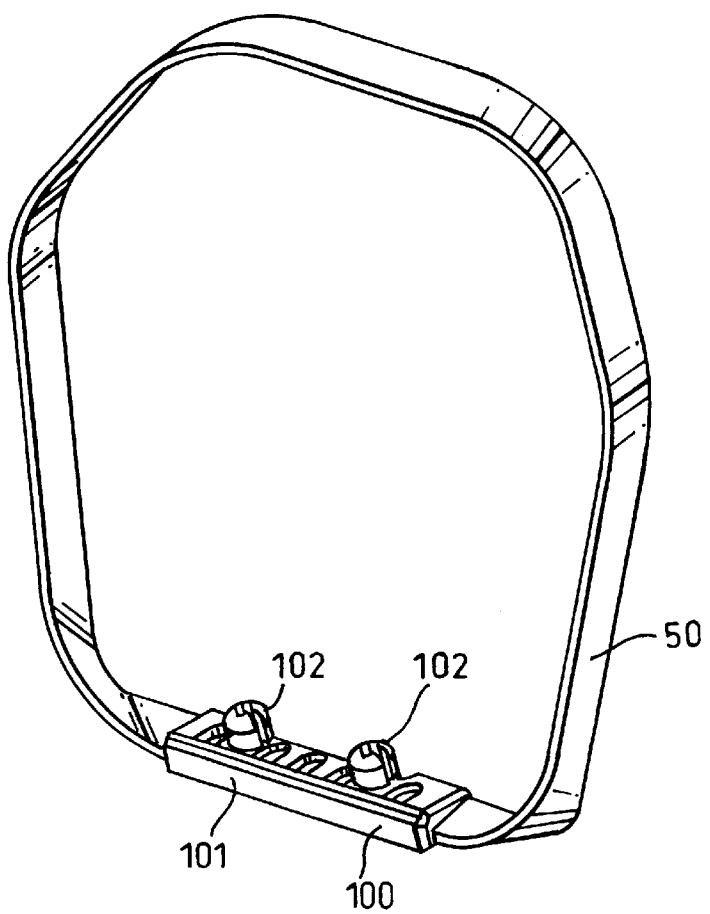
FIG. 10 gives a view of a strap to be used in the third embodiment.
Figure 11:
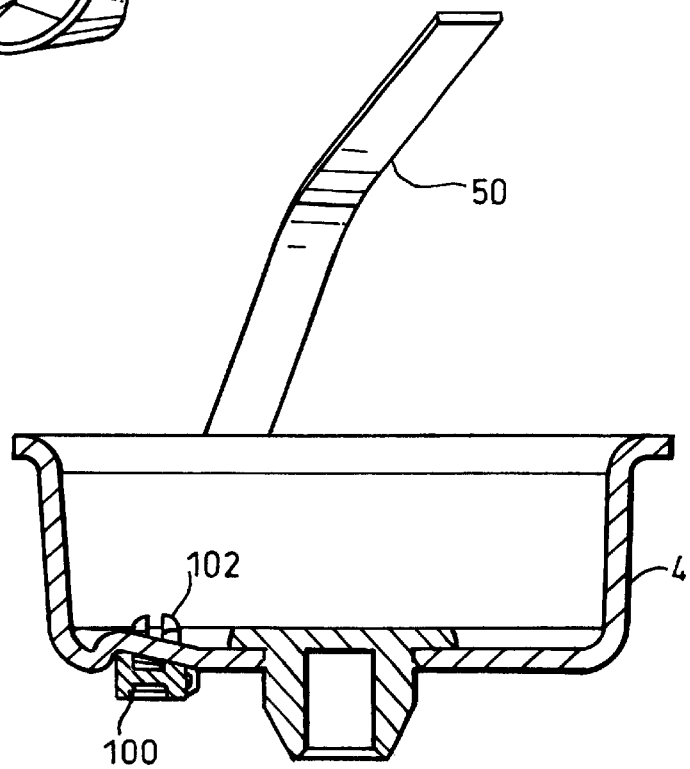
FIG. 11 is partial sectional view showing the fixing of the strap 50 in the third embodiment.

FIG. 10 illustrates the strap 50 and the clip 100 in more detail. The clip 100 has an elongate part 101 which is moulded around the strap 50, to secure the clip 100 to the strap 50. That elongate part 101 has projections 102 extending therefrom which projections 102 engage suitable bores in the cup 4. That engagement can be seen more clearly in the view of FIG. 11, in which the parts of the mount other than the cup 4 and strap 50 are omitted for the sake of clarity. Thus, the engagement of the projections 102 with the corresponding bores of the cup 4 fixes the clip 100 to the cup 4, hence fixing the strap 5 to the mount.

Figure 12:
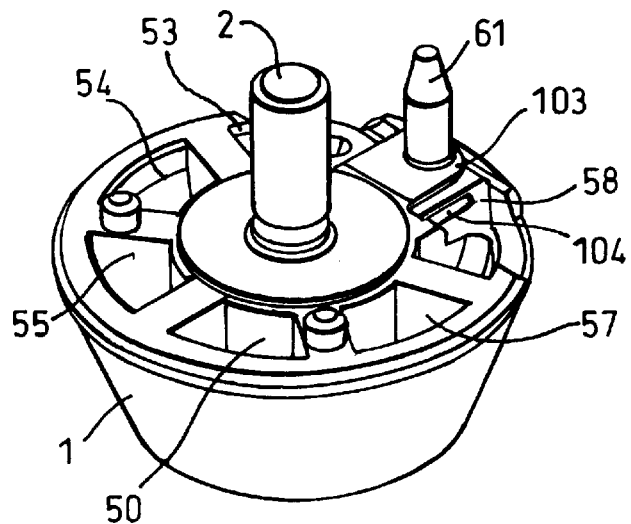
FIG. 12 is a perspective view of the boss of the third embodiment.
Figure 13:
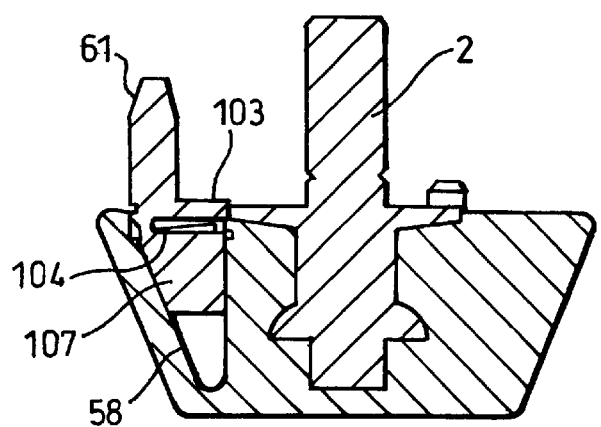
FIG. 13 is a sectional view through the boss of FIG. 12.

The strap 50 extends around the mount to overlie the boss 1 an orientation clip 103 is then secured to the boss 1 in a manner similar to the connection of the orientation clip 51 in the earlier embodiments. As shown in FIGS. 12 and 13, the orientation clip 103 extends in to a bore 58 in the boss 1, to fix the orientation clip to the boss 1 in a manner similar to the fixing of the orientation clip of the first and second embodiment. However, in this embodiment, the strap is not fixed to the orientation clip 103. Instead, the orientation clip has a slot 104 extending therethrough which lies generally parallel to the top surface of the boss 1, when the orientation clip 103 is mounted in the boss. The strap is then inserted in to the slot 104 through a mouth 105, that mouth having a lip 106 which holds the strap in the slot 104. The strap is, however, free to slide in the slot 104 and thus the position of the strap 50 around the mount can be adjusted by such sliding, to ensure that there are equal amounts of strap on each side of the mount, to prevent un-equal loading of the strap.

Figure 14:
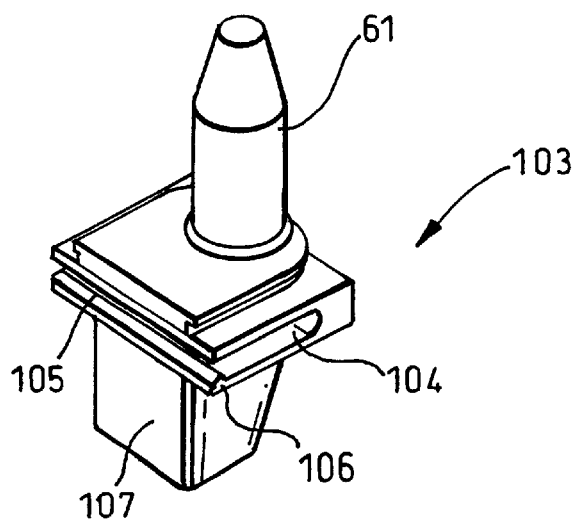
FIG. 14 is an orientation clip used in the third embodiment.

Note that FIG. 14 also shows that the orientation clip 103 has a downwardly projecting tang 107 which engages the bore 58. The structure of the mount, the heat shield 70, etc of this third embodiment may otherwise be similar to the first and second embodiment, and therefore will not be described in further detail.

In all the embodiments described above, the strap 50 extends wholly around the mount. This is not essential and a fourth embodiment will now be described in which the strap is discontinuous. This embodiment will be described with reference to FIGS. 15 to 17. The parts which correspond to parts of one of the earlier embodiments are indicated by the same reference numerals. Again, the internal structure may be similar to FIG. 1, and conventional variations may also be used.

In this fourth embodiment, a clip 110 is fixed to the cup 4, and has two strap elements 111, 112; 113, 114 extending therefrom. Two strap elements 111, 112 extend around one side of the mount to an orientation clip 115 fixes to the boss 1, and the other strap elements 113, 114 extend from the clip 110 to a second orientation clip 116 fixed to the boss 1. There is thus a gap in the strap between the orientation clip 115 and 116.

Figure 16:
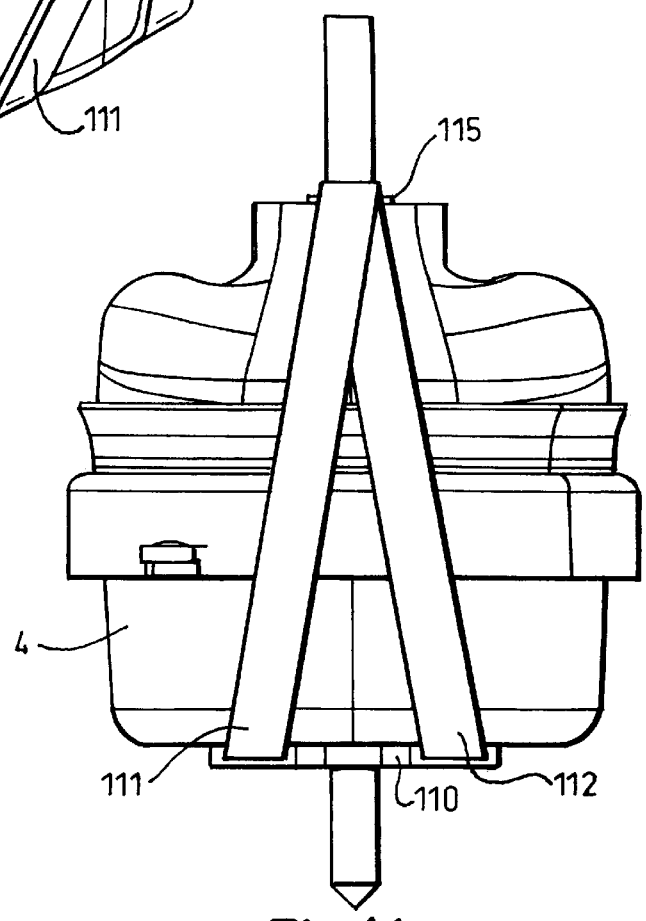
FIG. 16 is a side view of the fourth embodiment.

The side view of FIG. 16 shows that the strap elements 111, 112 form a V-shape with the base of the V being at the orientation clip 115 and the top thereof being at the clip 110. Thus, the forces on the mount due to the strap elements 111, 112 are symmetric. The same in true of the strap elements 113, 114.

Figure 17:
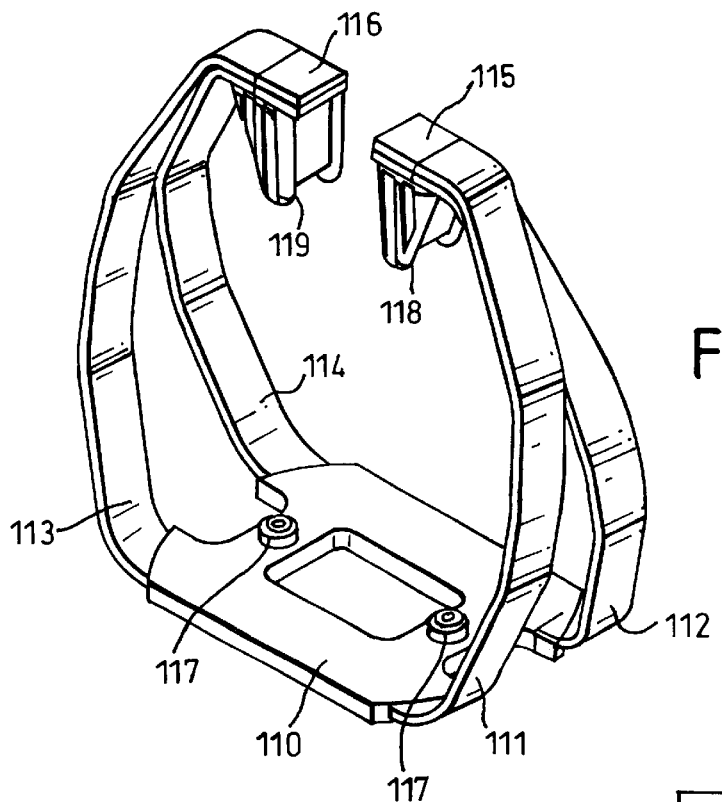
FIG. 17 illustrates the strap to be used in the fourth embodiment.

The clip 110 has projections 117 extending therefrom which engage the cup 4 in a way similar to the projections 102 of the third embodiment. Thus, the clip 110 is fixed to the cup 4. The orientation clips 115, 116 may also be fixed the their respective strap elements, or alternatively may act as a clamp on those strap elements, to enable to position of the strap elements to be adjusted. FIG. 17 also shows that each orientation clip 115, 116 has a corresponding projection 118, 119 which extend in to the boss 1 and fix the orientation clips 115, 116 to the boss, in a manner similar to that illustrated in FIG. 13.

Figure 15:
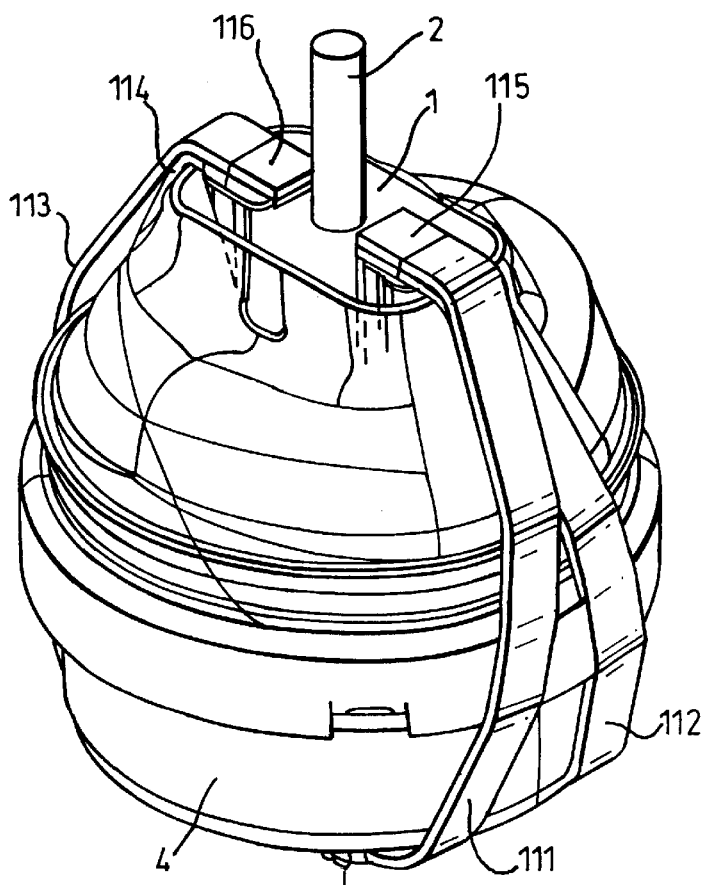
FIG. 15 is perspective view of a fourth embodiment of a hydraulically damped mounting device according to the present invention.
Figure 18:
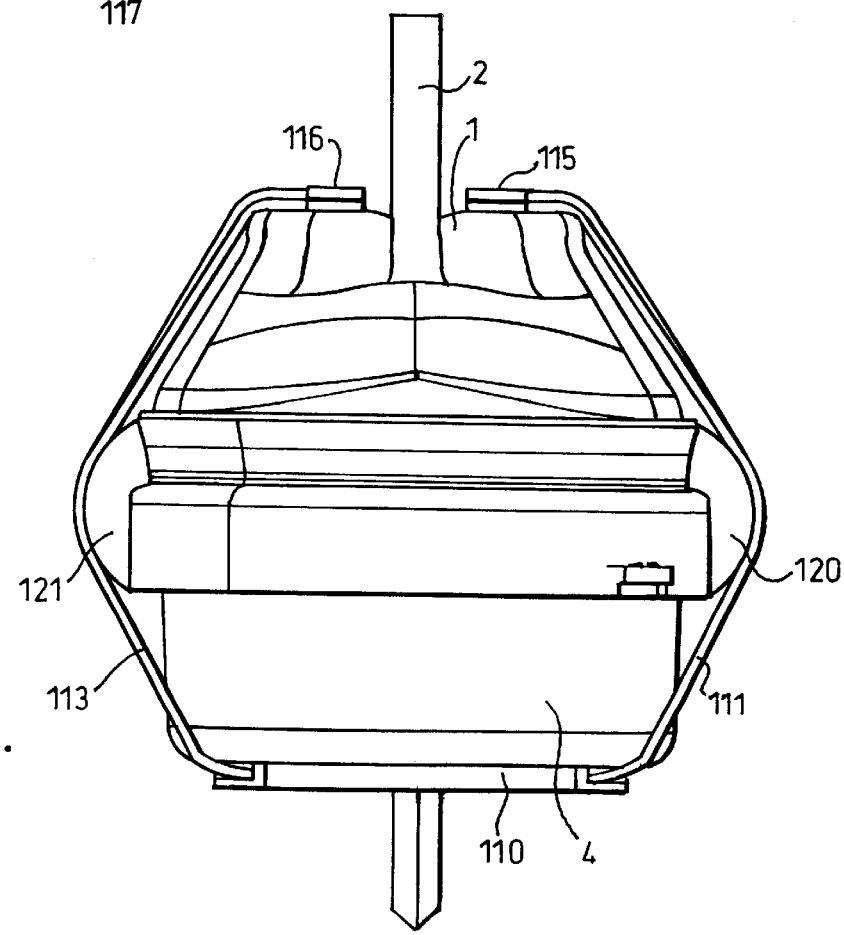
FIG. 18 illustrates side view of a fifth embodiment, being a modification of the fourth embodiment.

FIG. 18 illustrates an embodiment which is a modification of the fourth embodiment, with a similar strap arrangement. Components in FIG. 18 which correspond to those in FIGS. 15–17 are indicated by the same reference numerals and will not be described in further detail.

In the fifth embodiment of FIG. 18, resilient pads 120, 121 are provided on the sides of the mounting device. They may, for example, be moulded onto the clamping ring 41 in FIG. 1. Note that, although not visible in FIG. 18, the pads 120, 121 will contact the strap elements 112, 114 as well as the strap elements 111, 113.

Since the pads 120, 121 are resilient, e.g. because they are made of rubber, they will deform under pressure of the strap elements when the boss 1 moves upwardly relative to the cup. They will thus impart a resilience to the mount structure. They enable the effective resistance to movements by the strap elements to be adjusted to an appropriate value. The stiffness of the strap depends on the material to which it is made, and thus the arrangement of FIG. 18 enables the use of a substantially inelastic material (e.g. Kevlar or similar material) to be used and yet to have some resilience in the effect caused by the strap on the mounting device.

What is claimed is:

1. A hydraulically damped amounting device comprising:
   first and second anchor parts connected by a first deformable wall;
   a working chamber at least partially bound by the first deformable wall;
   a compensation chamber for the hydraulic fluid, the compensation chamber being bounded by a second deformable wall;
   a passageway for hydraulic fluid, interconnecting said working chamber and said compensation chamber;
   a strap extending between the first and second anchor parts and fixed to at least one of said first and second anchor parts; and
   a clip secured to said strap, the clip being mounted to the first or second anchor part.

2. A hydraulically damped mounting device according to claim 1, wherein the clip has at least one projection which engages at least one bore in the corresponding anchor part.

3. A hydraulically damped mounting device according to claim 1, wherein the clip has at least one according to claim 1, wherein the first anchor part is a cup further projection for securing a heat shield to the device.

4. A hydraulically damped mounting device according to claim 1, wherein the strap is a closed loop.

5. A hydraulically damped mounting device according to claim 1, wherein the strap has at least two strap parts, each strap part being fixed to one of said first and second anchor parts and extending to, and being secured to, the other of said first and second anchor parts.

6. A hydraulically damped mounting device according to claim 1, wherein the first anchor part is a cup containing the compensation chamber, said cup having a mouth, and the second anchor part is a boss aligned with the mouth of the cup and connected thereto by the first deformable wall.

7. A hydraulically damped mounting device according to claim 6, wherein the strap is fixed to the boss.

8. A hydraulically damped mounting device according to claim 6, wherein the cup has a slot therein for receiving a part of the strap, the cup having a deformable tang for securing the strap in the slot.

9. A hydraulically damped mounting device according to claim 6, wherein the strap is fixed to the cup.

10. A hydraulically damped mounting device according to claim 9, wherein the strap is secured to the boss by the clip, said clip being a location clip.

11. A hydraulically damped mounting device according to claim 10, wherein said location clip is slidably mounted on the strap.

12. A hydraulically damped mounting device according claim 6, having at least one guide on the strap, the at least one guide contacting a side of the device intermediate the top of the boss and the base of the cup.

13. A hydraulically damped mounting device according to claim 1, having at least one resilient pad between the strap and another part of the mounting device.

14. A hydraulically damped mounting device according to claim 13 having two of said pads on opposite sides of the mounting device.

15. A hydraulically damped mounting device comprising:
   first and second anchor parts connected by a first deformable wall;
   a working chamber at least partially bounded by the first deformable wall;
   a compensation chamber for hydraulic fluid, the compensation chamber being bounded by a second deformable wall;
   a passageway for the hydraulic fluid, interconnecting said working chamber and said compensation chamber;
   a strap extending between the first and second anchor parts and fixed to at least one of said first and second anchor parts, the strap and the first and second anchor parts forming a loop around the working chamber; and
   a clip secured to said strap, the, clip being mounted to the first or second anchor part.

16. A hydraulically damped mounting device according to claim 15, wherein the strap has at least two strap parts, each strap part being fixed to one of said first and second anchor parts and extending to, and being secured to, the other of said first and second anchor parts.

17. A hydraulically damped mounting device according to claim 16, wherein the first anchor part is a cup containing the compensation chamber, said cup having a mouth, and the second anchor part is a boss aligned with the mouth of the cup and connected thereto by the first deformable wall.

* * * * *

UNITED STATES PATENT AND TRADEMARK OFFICE
CERTIFICATE OF CORRECTION

PATENT NO. : 6,550,752 B2
DATED : April 22, 2003
INVENTOR(S) : Ian Nicholson and Adam Crabb It is certified that error appears in the above-identified patent and that said Letters Patent is hereby corrected as shown below:

Column 6,
Line 9, add -- , -- after "therefrom".

Column 7,
Lines 52 and 53, delete "according to claim 1, wherein the first anchor part is a cup,"

Signed and Sealed this

Fifteenth Day of February, 2005

JON W. DUDAS
*Director of the United States Patent and Trademark Office*